July 15, 1952 — N. I. PAULSEN — 2,603,046
METHOD OF MAKING AIRTIGHT MOISTUREPROOF CLOSED CONTAINERS
Filed Nov. 23, 1945 — 3 Sheets-Sheet 1
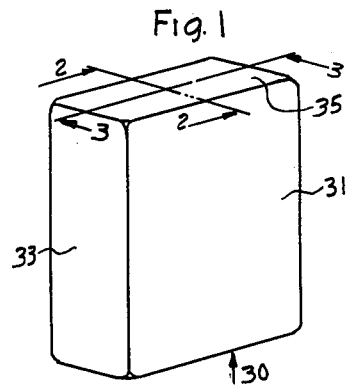
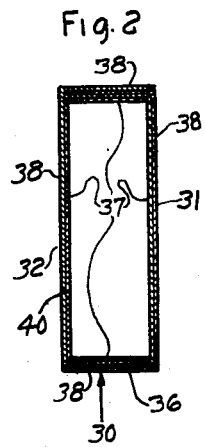
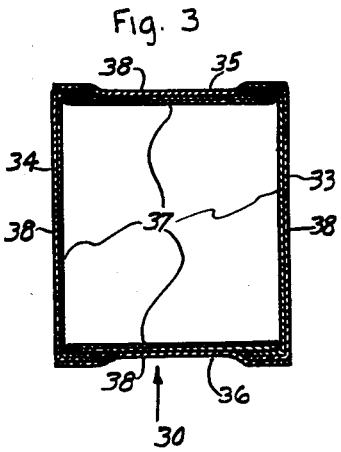
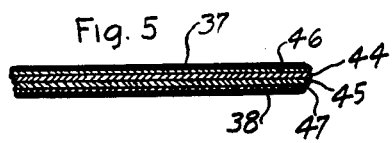
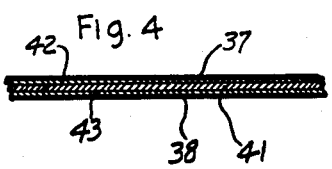
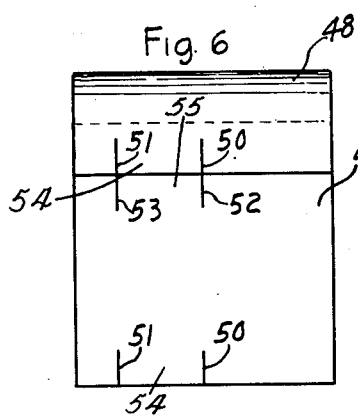
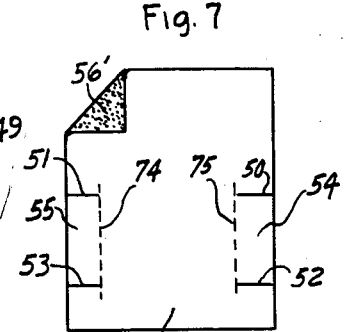
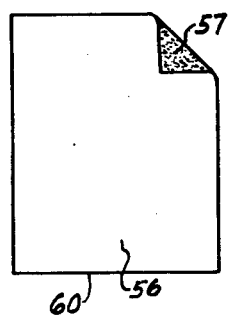
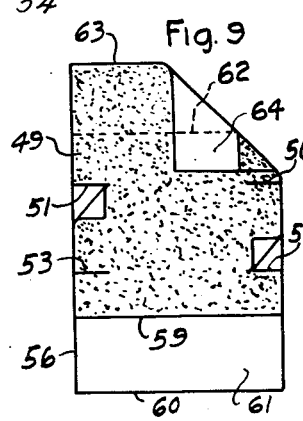
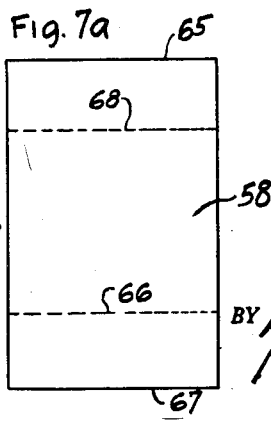
INVENTOR.
Neal I. Paulsen
BY
Attorney July 15, 1952     N. I. PAULSEN     2,603,046
METHOD OF MAKING AIRTIGHT MOISTUREPROOF
CLOSED CONTAINERS
Filed Nov. 23, 1945     3 Sheets-Sheet 2
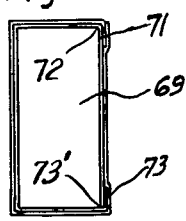
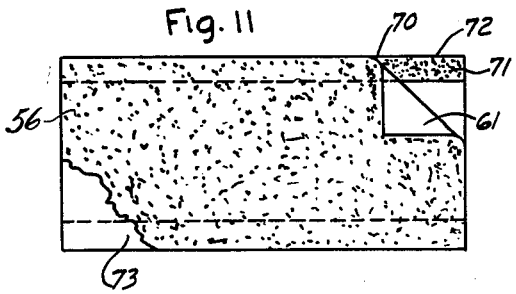
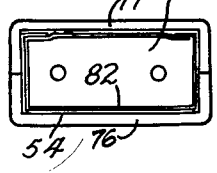
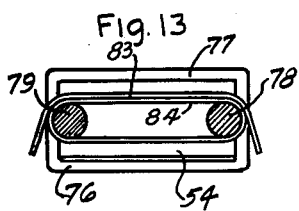
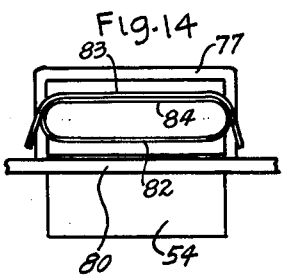
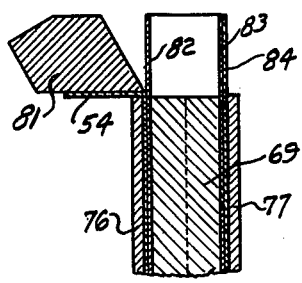
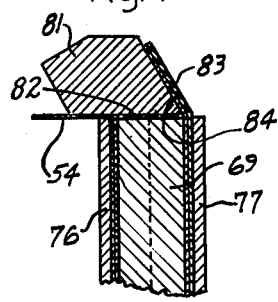
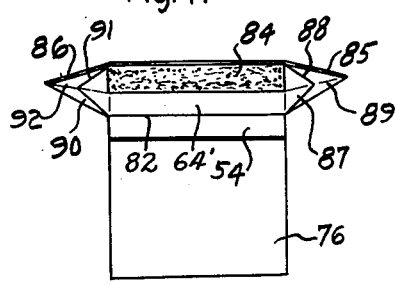
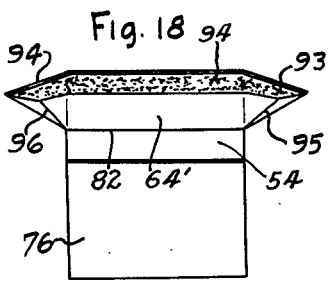
INVENTOR.
Neal I. Paulsen
BY
*J. A. Whiteley*
Attorney July 15, 1952     N. I. PAULSEN     2,603,046
METHOD OF MAKING AIRTIGHT MOISTUREPROOF
CLOSED CONTAINERS
Filed Nov. 23, 1945     3 Sheets-Sheet 3
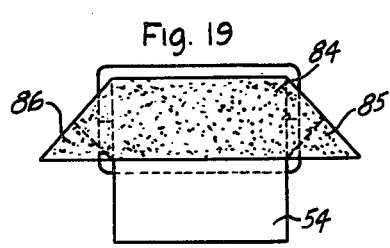
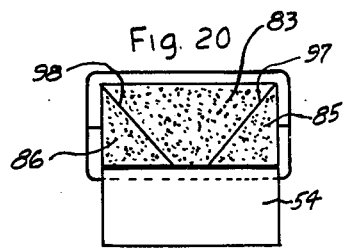
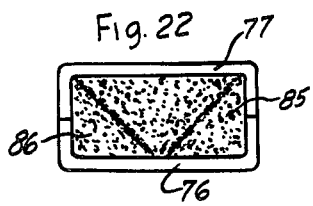
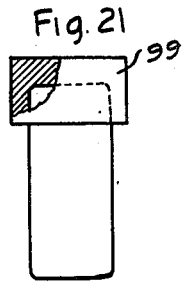
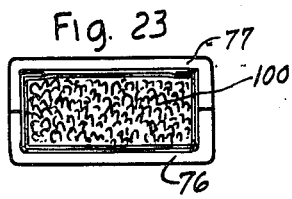
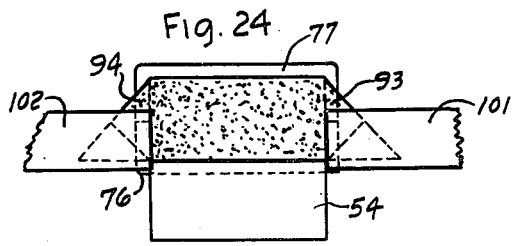
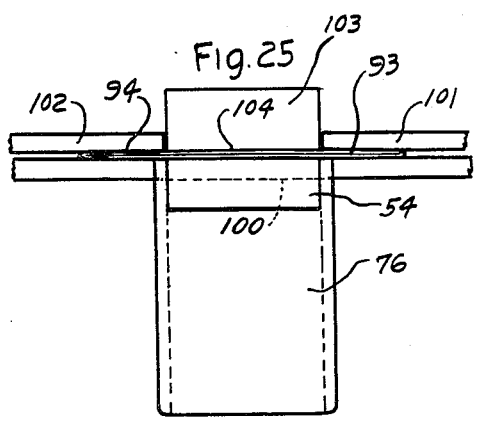
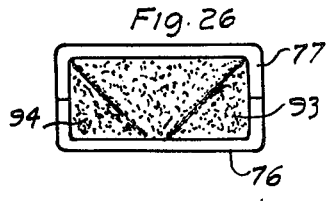
INVENTOR.
Neal I. Paulsen
BY
Attorney Patented July 15, 1952

2,603,046

UNITED STATES PATENT OFFICE 2,603,046

METHOD OF MAKING AIRTIGHT MOISTURE-PROOF CLOSED CONTAINERS

Neal I. Paulsen, Minneapolis, Minn., assignor to Reynolds Metals Company, Richmond, Va., a corporation of Delaware Application November 23, 1945, Serial No. 630,224

12 Claims. (Cl. 53—10)

My invention relates to an air-tight moisture-proof closed container and the method of making same, and has for its object the production of a container for perishables or food articles which may be damaged by absorbing moisture which has the inside and the outside of the container in all of its parts when fully closed, with the product to be protected therein, completely covered with flexible impervious material such as metal foil, wherein heat sealing means is employed between the respective layers of metal foil, and which, without the use of cardboard or other stiffening means, produces sufficiently rigid and stiff walls for all the walls of the container.

Heretofore metal foil, such as tin foil and aluminum foil, rolled very thin has been employed in connection with containers for various products, specifically food products. Principally this has been in a single layer over one set of surfaces of the container. Some attempts have been made to cover the inner and outer walls of cardboard cartons with metal foil.

The food products to be protected by my container such as cereal foods, milk powder, egg powder and the like, are rapidly deteriorated by the absorption of moisture. In the case of cereal foods it is customary and desirable to put them in containers adapted to hold a serving for one person. From the very nature of this practice it follows that such containers may hold their contents for extended periods of time up to many months before they are eaten. If moisture has been absorbed in any considerable amount the quality and good eating characteristics of such foods are seriously deteriorated, often to the point where they cannot be eaten at all.

A single layer of foil covering the surface of a container, has lacked complete effectiveness for two reasons: First, because foil as manufactured in the thin gages used for container purposes invariably has pinholes through the body of the foil which permit ready infiltration of moisture-containing air; and second, because the joints of the foil along the sides and particularly at the ends of the container, even where heat sealing is employed, are frequently not tight and permit leakage to the interior of the container.

The metal foil itself does not absorb moisture but the openings through it permit moisture to be absorbed by the non-foil parts of the body of the container and in turn to be absorbed by the contents of the container. The use of two layers of foil heat sealed together to form the entire substance of the walls of a container effectively blocks these openings.

The attempts to produce a moisture-proof package by applying metal foil to the outside and inside of cardboard cartons have not been successful for many reasons, among them because the cardboard itself absorbs moisture through the openings of the foil on the outside which it transmits through the openings in the foil on the inside, and, perhaps more important, it has been found to be impractical, if not absolutely impossible, to make a moisture-proof closure of the end of the carton where the material is introduced.

I have discovered that if some suitable body material such as metal foil is applied to both the outside and the inside surfaces of the container and heat sealed to a sealing carrier between the strips of foil, and if this first-named material is so folded in relation to the heat sealing material that there is complete sealing of all joints, including those produced at the ends of the container, not only will the leak openings which permit moisture to push through to the contents of the container be eliminated, but it also provides sufficient rigidity to the walls of the container to maintain them without the necessity of other stiffening means than the heat sealing material alone.

This heat sealing material, I discovered, could be either in the form of a thickness of wax-impregnated paper, to which the body material can be applied directly, as a filler between the two parts of body material, after which heat is applied and the filler at the same time causes the body material to adhere thereto and to seal the two sheets of body material together, so, with the filler and the two layers of body material, there is formed an integrated wall; or the foil may have applied thereto, and caused to adhere thereto in advance of forming the container, heat sealing material, so two sheets of such combined material and body material can then be heat sealed together to produce all container walls.

It is a principal object of my invention to provide a container having all its outside and inside walls formed of some suitable body material such as metal foil heat sealed together.

It is a further object of my invention to have the container formed with its outside and inside walls all of metal foil and with an intervening body of heat sealing material whereby the parts of said walls are sealed to form integral wall portions of the container.

It is a further object of my invention, by the use of suitable body material such as metal foil upon the inside and outside surfaces of a container, and by using a heat sealing material between the layers of body material which is heat sealed thereto, to produce a container having wall bodies which are sufficiently strong and rigid to comprise the entire substance of the container walls and of the container, without the use of reinforcing or stiffening material.

It is a further object of my invention to dispose the heat sealing material relative to the layer of body material so that the respective layers of foil are offset one to the other and the heat sealing material will extend as a facing over those parts of each strip of body material which do not face corresponding parts of other body material, whereby, when a strip of such combined body material is formed into a tube and the ends are folded, there will be heat sealing against body material over all the surfaces of the ends thereof.

It is a further object of my invention in producing my container to apply two strips of foil or other body material, either with or without the heat sealing material attached thereto, to opposite sides of heat sealing material of greater absolute extent than the length of each strip of foil, so one strip of foil will extend from one edge of the heat sealing material and the other strip of foil will extend from the other edge of the heat sealing material, leaving in each instance a band of heat sealing material exposed at and on opposite sides of the respective ends of the combined metal foil and heat sealing material.

It is a further object of my invention to form the combined strips of metal foil or other body material as just above described into a tube with the portions outlined by the slits on the same side but on opposite ends of the tube, and to heat seal the parts of the tube together between the lines connecting the inner ends of the aforesaid pair of slits.

It is a further object of my invention to separate from an end of the tube the strip of foil or other body material between the two slits and thereafter to form the end of the tube so as to fold the adjacent strip of foil material with its foil face down, the opposite strip of foil material sloping over the down foil face, and material at the ends of said strips being formed into triangular extensions.

It is a further object of my invention to pull said extensions out and bring the faces of the body material which they are connected down upon the heat sealing outer surface of the folded down strip between said extensions, and to seal it thereto.

It is a further object of my invention to turn the triangular extensions back upon the surface of the previously sealed strips of body material at the end of the container and to turn over the flap between the slits, and to heat seal it upon said turned down end and extensions to complete the bottom end wall and the sealing thereto of the container.

It is a further object of my invention to leave the other end of the tube open for free access of the product to be marketed therein while the container is being filled, and thereafter to heat seal the parts together to close the filling end of the container without using any support during the heat sealing operation.

The full objects and advantages of my invention will appear more fully in the detailed description thereof given in the appended specification, and the novel features by which the aforementioned advantageous and useful results are obtained will be particularly pointed out in the claims.

In the drawings illustrating an application of my invention in some of its forms:

Fig. 1 illustrates a perspective view of my container completely sealed.

Fig. 2 is a sectional view taken on line 2—2 of Fig. 1.

Fig. 3 is a sectional view taken on line 3—3 of Fig. 1.

Fig. 4 is a section through a part of one of the walls of the container, exaggerated as to size in order to show the parts, and giving one form of arrangement of the parts in a container.

Fig. 5 is likewise a section of the wall of the container of a different form of arrangement from that shown in Fig. 4 on an exaggerated scale to show the component parts thereof.

Fig. 6 illustrates a step in the method of making containers showing the manner in which foil, either with or without a backing of heat-sealing material, may be drawn from a roll and cut into the right length, and be formed with slits at the side edges in the proper position for the production of my novel container.

Fig. 7 is a plan view of one of the sheets of material wherein a heat-sealed backing is attached to the metal foil with the slits in the edges therein and with a corner turned down to show the metal foil on one side thereof.

Fig. 8 is a plan view similar to Fig. 7 of the non-slit strip of material used in conjunction with the slit strip shown in Fig. 7 for making my container.

Fig. 7a illustrates a strip of heat-sealing filler material not attached to the metal foil, to be used with strips of metal foil such as illustrated as being cut from a roll of metal foil in Fig. 6, where there is no heat-sealing backing on the metal foil before application to the strip of heat-sealing material.

Fig. 9 shows the manner in which two strips of metal foil with heat-sealing backing, such as is shown in Figs. 7 and 8, or without heat-sealing backing, may be attached to the filler strip shown in Fig. 7a or put together before and after heat-sealing.

Fig. 10 illustrates the end of a tube formed from folding the parts shown in Fig. 9.

Fig. 11 is a plan view of a tube rectangular in cross-section formed from the combined pieces shown in Fig. 9 with corner portions turned down and broken away to show the form of sealing and union of contacting portions of the tube.

Fig. 12 is an end view of the tube shown in Fig. 10 positioned horizontally and placed about a central mandrel and surrounded by a split casing.

Fig. 13 is a similar view showing the manner in which spreading of the tube ends throws down the flap between the two slits.

Fig. 14 shows the manner of turning the free flap between the slits to one side.

Fig. 15 shows the approach of a shaper moving in the plane of the turned-down free flap between the two slits and about to be moved forward to shape the top.

Fig. 16 shows the shaper in shaping position.

Fig. 17 shows the shaper withdrawn and the triangular flap ends that have been shaped thereby.

Fig. 18 illustrates the same arrangement where the triangular extension has been slit at each side.

Fig. 19 shows the back unslitted portion of the top flap with the triangular extensions drawn out into a common horizontal plane.

Fig. 20 shows the same end view with the triangular extensions folded in.

Fig. 21 shows a top shaping member applied to the end of the container to round the edges and corners thereof.

Fig. 22 shows the finished container end after the flap between the slits has been turned over it and has been sealed to it and the shaper of Fig. 21 has been applied thereto.

Fig. 23 illustrates the other end of the open-ended tube filled with the product, such as cereal breakfast food or the like loaded into the container.

Fig. 24 shows the top formed as in Fig. 19 with the triangular parts pulled outwardly tight to permit heat-sealing without under support.

Fig. 25 shows the manner of the first heat-sealing of the top opening.

Fig. 26 is a view with the triangular extensions turned in and the flap between the slits turned into sealing position giving the final sealing of the filling end of the container.

While a preferred form of body material to be employed in connection with my method invention is metal foil such as aluminum foil, tin foil or the like, and in the following specification I have for convenience generally referred to the body material as foil or metal foil, I do not wish to limit myself to foil or metal foil herein, as it is obvious that any other material of a thin and flexible type which is suitable to have performed upon it the steps of my process so as to produce a heat sealed closed container without other stiffening means than such body material and the heat sealing applied thereto, is available for the practice of my process and within the scope of my invention.

As illustrated, the container 30, as shown in Figs. 1, 2 and 3, comprises side walls 31 and 32, end walls 33 and 34, a top wall 35 and a bottom wall 36. This describes the container in its final and closed form after it has been filled and is ready for the market with whatever perishable product it may contain.

In the sectional views of Figs. 2 and 3, which are necessarily somewhat exaggerated in thickness in order to show what is involved, there is an inner skin or lining 37 of a metal foil. This is shown by a heavy black line.

Likewise, the outer surface of the entire container 30 has an outer skin of metal foil 38, which also is shown by a heavy black line. As will be hereinafter pointed out more in detail, these two skins of metal foil, 37 on the inside and 38 on the outside, are separated by a layer or layers of heat-sealing material 40 which in the process of making and sealing the carton has heat sealed the metal foil skins 37 and 38 into integral and sufficiently rigid and stiff laminated walls forming the sides, ends, top and bottom of the complete container.

The actual construction of the body of these walls, in the two forms here referred to, is shown in Figs. 4 and 5. Here the metal foil skins 37 and 38 respectively are shown on the inside and outside walls of the container. In the form of Fig. 4 the carrier 41 of heat sealing material, such as a suitable form of wax, is shown between the metal foil skins 37 and 38. This member may be made of any suitable porous paper material, often referred to as tissue. It may be but a single thickness, such material impregnated with wax to receive the metal foil on each side thereof and to have it adhered thereto by the application of heat, effecting heat-sealing, or it may, as shown in Fig. 4, embody films of adhesive 42 and 43 for direct adhering contact between the adjacent surfaces of the metal foil skins 37 and 38 and the heat sealing carrier strip 41.

In the form shown in Fig. 5, and which may be advantageously employed in the making of my container, the layers or skins 37 and 38 of metal foil are exactly the same as in Fig. 4 when the wall body has been completed. However, in this form there will be layers of wax-impregnated tissue 44 and 45 between the metal foil surface skins 37 and 38.

These layers 44 and 45 may be respectively adhered to the metal skins 37 and 38 by layers of adhesive 46 and 47 and this may be done before the foil is put in place for the container walls. In other words, the foil and its tissue wax container for heat-sealing may be united so that the strips of foil will carry with them the strips of heat-sealing tissue on the roll itself, and as the strips are cut from the roll they provide both the foil cover for the inner and outer surface of the container and the intervening heat-sealing tissues.

As shown in Fig. 6, a roll 48 may be formed of either metal foil only or metal foil having a backing of heat-sealing material. As this metal foil or combined metal foil and heat sealing material is drawn from the roll it is cut into rectangular pieces 49, and at the side sets of slits 50 and 51, and 52 and 53 are cut which leave between each pair of slits flap members 54 and 55 and as indicated in Figs. 19, 20 and 24 the flexible members 54 (and 55) have a depth and extent such as just to cover an entire end of the package formed by my method.

From another roll of metal foil or of metal foil combined with heat-sealing material will be cut other rectangular pieces 56 which do not have any slits or flaps, but otherwise may be of the same length and width as the slit pieces 49, or, if desired, may differ in length and width. At least one side thereof will be formed of metal foil, as indicated at 56 and 57 where corners are shown turned down as in Figs. 7 and 8.

Where the members 49 and 56 cut from the roll 48 are metal foil only, a special strip 58 of wax-impregnated tissue forming a heat-sealing body is cut which is substantially longer than the length of the pieces 49 and 56 shown in Figs. 7 and 8. When the pieces 49 and 56 are employed they will be placed over each other with the heat-sealing tissue between and in contact with adjacent faces thereof, as indicated in Fig. 9, but not with their edges meeting. The edge 59 of member 49 will be spaced from the edge 60 of member 58 to leave an exposed heat-sealing face on a portion 61 of the member 58 between the edges 59 and 60. And likewise the edge 62 of piece 56 (shown in dotted lines on Fig. 9) will be spaced the same distance from the edge 63 of member 49 to leave a strip 64 of exposed heat-sealing material.

Where the heat-sealing body is separate from the foil the same result is obtained by placing a piece of foil corresponding in size to the member 49 above described with its edge 63 coinciding with the edge 65 of the piece 58 and its lower edge appearing at the dotted line 66 on said piece 58, and the piece 56 having its edge 60 coinciding with the edge 67 of the heat-sealing piece 58 and its other edge 62 at the dotted line 68. In either of these cases the respective bands 61 and 64 of exposed heat-sealing material will appear on opposite sides and at opposite ends of the combined member uniting the members 49 and 56, and will be employed in the formation of the container in the same way.

Whichever form is employed, the combined sheet made up of the two strips 49 and 56, offset at their ends, and each formed of body material only such as a metal foil, applied to the special strip of heat sealing material 58, or the strips 49 and 56 having a backing of heat-sealing material, have a combined length somewhat greater than the shortest circumference of the completed container. When, therefore, this combined strip is folded into a tube transversely of its length, there will be an overlap of the respective heat sealing faces of the sheets both inside and outside of the container, insuring effective heat sealing at the meeting margins of the outer and inner skins of metal foil respectively, thus resulting in complete sealing of the laminated tube which provides the side and end walls of the container at all points about it, with all corners without joints.

Using a central mandrel 69, Fig. 10, a tube of the combined pieces, such as is shown in Fig. 9, is formed about the mandrel. This tube will be open at both ends and will have metal foil entirely covering its outside and inside surfaces, with a heat sealed lap joint at the ends of both of them.

The single joint, indicated at 70 of Fig. 11 at one of the corners of the tube, has a strip 71 turned over the corner 72, Fig. 11, upon which will seal the heat-sealing surface 61 of unslitted piece 56. The corners of this tube are thus shown to be formed of unbroken metal foil both inside and out and the turned-over strips, strip 71 on one side and strip 73 indicated in dotted lines on Fig. 11, are directly covered on each side with portions of heat-sealing surfaces 61 and 64, which otherwise are sealed together, thus producing both complete impervious sealing of the walls at the corners and a strong body for those walls which does not need any reinforcing.

As shown in Figs. 10 and 11 the associated strips of foil 49 and 56, with their exposed heat-sealing surfaces 61 and 64, Fig. 9, when folded crosswise of their length, will bring a flap 71 over the corner 72 of strip 56 and will bring a flap 73 over the end corner 73' of strip 56, thus covering broken corners at 71 and 73, with heat-sealing material contacting foil surfaces, respectively, of the strip 49 (by flap 73) and flap 71 by foil strip 63. In this way the four longitudinal corners of the package each embodies an unbroken portion of strip turned over such corners and sealed to the other strip. To substantially the same effect is the showing of Figs. 2 and 3.

The application of heat to seal the various parts for bringing the inner and outer skins of metal and the intervening body of heat sealing material into a single integrated laminated body for each and every one of the walls may be effected in many different ways.

One method which I have found practical and have employed successfully is to form the tube, and fold what may be called the bottom end in the manner hereinafter pointed out, and then to apply within the cup thus formed a heating arrangement adjacent and serially engageable with a side wall, an end wall, another side wall and end wall and a bottom wall to integrate as united laminated wall bodies these five walls of the completed container, thus leaving the other end of the tube open for filling with the contents, to be subsequently sealed as hereinafter described.

This form of heat sealing has certain advantages in that it heats and brings about sealing integration almost simultaneously, at least in rapid succession, the side and end walls and the bottom wall of the container. In practice the method of folding will be the same as has been heretofore described, except that the outer and inner layers or skins of foil and the intervening body of heat sealing material have not been fastened together. Obviously a rectangular heating member, not shown, of slightly less cross-sectional area and dimensions than the cross-sectional area of the tube end with a head end substantially that of the bottom of the tube may readily be employed for this sealing purpose.

In another method of effecting heat sealing, the tube while on the block 69 is heat sealed from outside all the way around within the limits outlining the inner edges of slots 50, 51 and 52, 53, as indicated in dotted lines on Fig. 7 at 74 and 75.

With the parts as shown in Fig. 10 and the inside mandrel 69 in position, a split casing formed of two parts 76 and 77 is applied outside mandrel 69 and the tube upon it, which has been heat-sealed in the areas above noted.

The tube is still rectangular in top plan, as shown in Fig. 12, but by drawing upon opposite ends of the tube with fingers or other pullers 78 and 79, as shown in Fig. 13, the flap 54 between slots 50 and 52 (or flap 55 at the other end of the tube) will separate from the other parts of the tube. Then by laying a rod indicated at 80, Fig. 14, upon the flap 54 it will come out into open position, leaving a heat sealing surface 64' of exposed heat sealing tube front 82.

A specially shaped pusher member 81, Figs. 15 and 16, is then put in the plane of the top of the flap 54 at right angles to the top of the mandrel 69 and pushed forward along that plane, which has the effect of turning down the front 82 of the tube swinging back the two portions 83 and 84 of the back of the tube above the top of mandrel 69, and projecting the sides of the tube in triangular extensions 85 and 86, as shown in Fig. 17.

These triangular portions are formed with folds at 87, 88 and 89 for extension 85 and at 90, 91 and 92 for extension 86.

As shown in Fig. 18 substantially the same result is obtained but in a slightly more compact way by forming slits at 93 and 94 with the result that only one fold takes place at 95 and 96.

As shown in Fig. 19 the triangular extensions 85 and 86 have been flattened out and the part 84 brought down flat upon the top of the mandrel and have been heat sealed together. The triangular portions 85 and 86 are turned inwardly as indicated in Fig. 20 forming joints over the edge parts as indicated at 97 and 98.

Referring to Figs. 17, 18 and 19, pulling back the flap 54 has exposed a surface 64' of heat-sealing material in the turned out front 82 of the tube 76. This heat-sealing material is also exposed at its triangular ends 95 and 96 before folding has been completed. When the folded part 84 of the back of the tube is brought down upon the surface 64' of the part 82, the metal of 84 is in contact with the heat-sealing surface of 64'. When heat is applied therefore a complete seal is effected running all around the top of the package and the corners of the package, and this is the basic and primary sealing of the bottom wall of the container. When the tabs 85 and 86 of the container, as shown in Fig. 19, are turned inwardly and the flap 54 turned over them, the bottom of the package is complete, although the flap 54 is not intended to seal the container, and its primary function is to uncover the heat-sealing material of the member 82. To perfect the container the casing portions 76 and 77 are withdrawn and a shaper 99, which may be heated if desired, is applied to the upper portion of the package producing rounded corners and edges as shown in Figs. 1 and 22. This has closed the bottom opening of the original tube.

In closing the other end, the container is first filled through the open top, in any well-known manner, with the material which is to go into the container, to the level indicated at 100 in Fig. 23, and in dotted lines in Fig. 25.

The triangular ends 93 and 94 are then clipped with pliers 101 and 102 or other pulling devices. These pulling devices go over the upper edges of the split casing parts 76 and 77, and when force is applied to the two tabs in opposite directions in the plane of the top edges of these split casing parts, the flat strips of metal foil with heat sealing material between them will be pulled tight and supported against excessive distortion by the tension upon the parts. It will be noted that the pliers or pullers grip the triangular parts close to their line of joinder with the short side corners of the container top so the force of the pull is effectively exercised to hold these contacting strips very nearly as if table-supported.

A heat applying block 103 having its end of a size to register inside of the inner limits of the casing members 76 and 77 is then applied to the outer of the strips so held, as shown in Fig. 25, and the heat from block 103 seals the parts together without any underneath support.

The triangular ends 93 and 94 are then turned over the upper surface indicated at 104 and the flap 54 is turned over these triangular ends and the strip surface, with its heat-sealing face against them. Heat sealer 103 is then applied to them within the inner limits of split casing parts 76 and 77. This results in a complete sealing of the filling end of the container, without any under support. As clearly indicated in Fig. 26, the tabs 93 and 94 have been turned down over the top surface and the flap 54 has been brought to overlie the tabs and heat-sealed across all or a part of the top to complete the package.

While I have described my invention as embodying a use of metal foil, it is not to be regarded as restricted to metal foil. There are various types of plastic film which are being developed and which have many of the characteristics of metal foil, and which it is my intention to use in place of metal foil, and which use is within the scope of my invention.

The advantages of my invention have been quite clearly pointed out in the detailed description given in the preceding specification. These advantages reside primarily in the production of a simple, inexpensive container which is wholly moisture-proof and the walls of which consist of inner and outer layers of metal, or plastic films or equivalent material, with a layer of heat sealing material between the outer and inner layers of metal foil, which, combined with the two layers of metal foil and the intervening layer of heat sealing material when heat sealed together, provide walls of sufficient rigidity and stiffness to properly support the contents of the container without other reinforcing or stiffening means.

Specific advantages of my invention reside in the various steps of process by which the container is formed, both primarily as an open-topped cup and after being filled with the product to be protected by the containers, so there are no possible leakage openings through the foil.

Other specific advantages are found in the manner of forming and assembling the respective inner and outer layers of metal foil or equivalent material with an inner layer of heat-sealing tissue between them, the manner of forming the container so all corners, edges and joints are completely heat-sealed or sealed by continuity of the metal foil, and the manner in which the open end of the open-ended container may readily be filled with the product to be protected thereby and thereafter said open end be heat-sealed without the use of any support for the parts which are successively brought together over said open end and produce a heat-sealed body of outer and inner metal foil and an intervening layer or layers of heat-sealing material, all united into an integrated laminated body strong enough in itself to support the contents of the container.

A further great advantage of my invention comes from the fact that a fully metal-protected moisture-proof container is provided which is even lighter than the ordinary cardboard container, and yet which may be cut for opening with greater facility and ease than a cardboard container, and, of course, with no comparison as to difficulty of opening of standard heavy-walled metal cans, yet which gives the same degree of protection against either moisture absorption by the contents of the container or moisture loss therefrom.

For while the invention has been defined as applying to dry products such as cereal foods, powdered milk and the like, and therefore being of particular value in preventing injury of the contents from the absorption of moisture thereby, the container also can be employed with equal effectiveness where the contents are moist and it is desired to retain the moisture therein.

I claim:

1. A step of the method of making air-tight moisture-proof containers, which consists in forming two sheets of metal foil of the same length and width, forming a sheet of heat-sealing material of the same width but of greater length than the sheets of foil, and positioning the said foil sheets upon the heat-sealing material at opposite sides thereof and with an end of each respectively coming to an edge of the heat-sealing material, thus leaving exposed bands of heat-sealing material at opposite sides and ends of the combined sheet, and securing together the pieces so positioned.

2. A method of making air-tight moisture-proof containers, which consists in forming two sheets of metal foil of substantially equal lengths, forming a flap at a side of one of said sheets, forming heat-sealing material on a side of each sheet, positioning the two sheets to have a portion of the heat-sealing material on each in contact, further positioning the two sheets to be offset to leave an exposed band of heat-sealing material turned toward the other at opposite ends of each sheet, folding lengthwise the combined sheets to form an open-ended tube, separating said flap at the end of said tube from the other parts of one sheet to expose the heat-sealing surface of said sheet, folding the end of the tube inside of said separated flap so as to bring the combined sheets of foil and heat-sealing material into a plane across the bottom end of the tube with the foil thereof contacting the exposed surface of heat-sealing material, forming triangular tabs extending outwardly therefrom, folding said tabs upon said combined end wall parts, folding the flap over the folded tabs and end wall parts, and applying heat to said bottom wall to seal it into an integrated laminated bottom structure.

3. A step in the method of forming air-tight moisture-proof containers, which consists in forming two rectangular sheets of metal foil of substantially equal linear dimensions, forming a layer of heat-sealing material on a side of each sheet, positioning the sheets with the heat-sealing material thereon in contact but with the sheets longitudinaly offset to leave an exposed band of heat-sealing material at each end of each sheet of metal foil facing toward each other, folding lengthwise the combined and contacting sheets while they are not attached to each other to form a tube which includes the side walls and material for the bottom end walls of the container, folding the bottom wall material into a substantial plane at right angles to the planes of the side walls, and subjecting all four side walls and the bottom end wall to heat to seal together into a unitary structure said bottom and side walls.

4. A method of forming air-tight moisture-proof containers, which consists in forming two rectangular sheets of metal foil of substantially equal linear dimensions, forming a layer of heat-sealing material on a side of each sheet, positioning the sheets with the heat-sealing material thereon in contact but with the sheets longitudinally offset to leave an exposed band of heat-sealing material at each end of each sheet of metal foil facing toward each other, folding lengthwise the combined and contacting sheets while they are not attached to each other to form a tube which includes the side walls and material for the bottom and top end walls of the container, folding the bottom wall material into a substantial plane at right angles to the planes of the side walls, subjecting all four side walls and the bottom wall to heat to seal together into a unitary structure said bottom and side walls with an open top, introducing through said open top a predetermined weight of product, folding the material at the top to form a top wall lying in the plane of the top edges of the side walls, and subjecting said folded top wall to heat to seal together all the sheets forming the same.

5. A step of the method of making air-tight moisture-proof containers, which consists in forming two pieces of pliable film each of the same length and width, applying heat-sealing material to a side of each said pieces, positioning the pieces one upon the other so the heat-sealing material will come between them, further positioning the pieces so that an end portion of heat-sealing material on each piece projects beyond the end edge of the other piece for a portion of its length so that said projecting portions of heat-sealing material will be exposed toward each other on opposite end portions of adjacent faces of the pieces, folding the associated pieces along lines extending crosswise of the combined lengths including the exposed portions to form a tube of associated pieces substantially rectangular in cross-section with the exposed parts of heat-sealing material of the respective pieces coming about opposite corners at one side of the tube and contacting a surface of the other film piece, and heat-sealing said contacting parts together to effect a sealing joinder that is air-tight.

6. A step of the method of making air-tight moisture-proof containers, which consists in applying to one side of a long strip of pliable film a layer of heat-sealing material and permanently attaching it to a surface thereof, thereafter forming from said strip two pieces of said combined film and heat-sealing material each of the same length, positioning the pieces one upon the other so the layers of heat-sealing material will come in contact between them and an end portion of each piece projects beyond the end edge of the other piece for a portion of their lengths and heat-sealing material will be exposed on opposite end portions of adjacent faces of the pieces, folding the associated pieces crosswise of their length to form a tube of the associated pieces substantially rectangular in cross-section, with the exposed parts of heat-sealing material of the respective sheets coming about opposite corners at one side of the tube and contacting a surface of the other film piece, and heat-sealing said contacting parts together to effect a sealing joinder that is air-tight.

7. A method of making air-tight moisture-proof containers with an open top, which consists of forming two sheets of pliable film of substantially equal lengths, forming a pair of slits through a side edge of one sheet to form a bottom flap of depth to cover a major part of the bottom end of the container, forming a strip of heat-sealing material effective for sealing action on both sides thereof, said last named strip being of substantially greater length than the lengths of the sheets of film, positioning the sheets of film in contact with and on opposite sides of the longer heat-sealing strip, positioning the sheets of film so an end edge of each sheet coincides respectively with an end edge of the heat-sealing strip at opposite ends thereof, so as to leave an exposed band of the heat-sealing strip extended in each case from the edge of the other sheet and on opposite sides thereof, folding crosswise the associated sheets to form an open-ended tube-like member rectangular in cross-section, with the bottom flap extending along one side at the bottom of the tube, swinging the bottom flap outwardly to expose the heat-sealing material on its inner side, folding the exposed heat-sealing material to form a bottom layer, folding a body of film from the other side at the bottom of the tube to overlie said bottom layer, forming triangular tabs and bringing them to overlie said folded body, swinging the bottom flap against these and other bottom parts, and applying heat to said bottom and all side walls to seal their parts together and form an integrated laminated open-topped container.

8. A step in the method of forming air-tight moisture-proof containers, which consists of forming two sheets of pliable film of substantially equal lengths, forming a strip of heat-sealing material effective for sealing action on both sides thereof, said last named strip being of substantially greater length than the length of each sheet of film, positioning the sheets of film in contact with and on opposite sides of the heat-sealing strip, positioning the sheets lengthwise of the strip with an end edge of each coinciding respectively with opposite end edges of the strip so as to leave an exposed band of the heat-sealing strip at each end thereof, folding the associated sheets crosswise of their length to form an open-ended tube-like member substantially rectangular in cross-section with a portion of the film and the bands of heat-sealing material passing unbroken around opposite corners of said member at one side of the tube, said exposed bands contacting respectively unbroken surfaces of the inner and outer sheets, and heat-sealing said exposed bands and contacted surfaces together.

9. A step in the method of making air-tight moisture-proof containers, which consists in forming two rectangular sheets of pliable film of substantially the same length, the widths of said sheets being less than their length, forming a strip of heat-sealing material of a width at least equal to the width but of greater length than the lengths of the sheets of film, and positioning said sheets lengthwise upon the heat-sealing material and facing towards each other at opposite sides thereof and with an end edge of each respectively coming to an opposite end edge of the heat-sealing strip, thus leaving exposed bands of heat-sealing material at opposite ends of the combined but unattached sheets, and folding the sheets and strip to form a tube embodying the side walls of the container and the material of the top and bottom walls of the container respectively before the sheets and strip have been secured together to form any of the walls.

10. A method of making a moisture-proof filled closed container, which consists in forming two sheets of pliable film of substantially equal lengths, each sheet formed with heat-sealing material on one side thereof, forming a flap at a side of one of said sheets, positioning the two sheets with the heat-sealing material of each in contact between them, positioning said sheets lengthwise in offset relation to leave exposed bands of heat-sealing material in facing relation at opposite ends of each sheet, said associated sheets being of a length somewhat greater than the circumference of the package to be formed, folding crosswise the combined sheets to form an open-ended rectangular tube, folding the lower portions of said sheet together to form a bottom wall, heat-sealing the bottom and four side walls to permanently unite them into an open-topped container, introducing into the container a selected quantity of product, thereafter swinging the top flap outwardly, forming triangular tabs extending outwardly in the plane of the top of the container, gripping said tabs and applying force outwardly in both directions to hold firmly the top in said plane, applying heat to the top wall while said top wall is so held to seal it into an integrated laminated body, thereafter swinging the tabs against the closed end of the container and covering said end with the flap.

11. A method of making air-tight moisture-proof containers, which consists in forming two rectangular sheets of pliable film of substantially the same length, the width of said sheets being less than their length, forming a layer of heat-sealing material on a side of each sheet, positioning said sheets with the respective layers of heat-sealing material facing towards each other and with an end edge of the respective sheets spaced from the end edge of the other sheet, thus leaving exposed bands of heat-sealing material at opposite ends of the associated sheets, folding the sheets to form the side walls and the bottom wall of the container respectively before the sheets and strips forming those walls have been secured together, and subjecting the four side walls and the bottom wall to heat to seal them together, thereafter introducing the contents of the package, and finally sealing the top to unite the entire container as an integral laminated product-filled structure.

12. A method of making air-tight moisture-proof filled containers, which consists in forming two rectangular sheets of pliable film of substantially the same length, the width of said sheets being less than their lengths, forming a layer of heat-sealing material on a side of each sheet and positioning said sheets with the respective layers of heat-sealing material contacting, folding the contacting sheets to form the side wall and the bottom wall of the container before the sheets forming those walls have been secured together, subjecting the four side walls and the bottom wall to heat to seal them together, thereafter introducing the contents of the package, and finally sealing the top wall to unite the entire container as an integral laminated product-filled structure.

NEAL I. PAULSEN.

REFERENCES CITED

The following references are of record in the file of this patent:

UNITED STATES PATENTS

| Number | Name | Date |
| --- | --- | --- |
| 536,604 | Conley | Apr. 2, 1895 |
| 1,983,870 | Ostwald | Dec. 11, 1934 |
| 2,003,494 | Reynolds | June 4, 1935 |
| 2,128,739 | Connor | Aug. 30, 1938 |
| 2,166,389 | Bergstein | July 18, 1939 |
| 2,223,754 | Waters | Dec. 3, 1940 |
| 2,307,902 | Vogt et al. | Jan. 12, 1943 |
| 2,311,733 | Bushman | Feb. 23, 1943 |